United States Patent
Suzuki et al.

(10) Patent No.: US 8,508,783 B2
(45) Date of Patent: Aug. 13, 2013

(54) PRINTER THAT PRINTS CODED INFORMATION UNDER CONTROL OF A PROCESSOR

(75) Inventors: Yuichiro Suzuki, Komaki (JP); Yuji Iida, Chita (JP); Junya Kawai, Nagoya (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 227 days.

(21) Appl. No.: 13/053,711

(22) Filed: Mar. 22, 2011

(65) Prior Publication Data

US 2011/0235123 A1 Sep. 29, 2011

(30) Foreign Application Priority Data

Mar. 29, 2010 (JP) ................................ 2010-074862
Dec. 22, 2010 (JP) ................................ 2010-285554

(51) Int. Cl.
*G06K 15/00* (2006.01)

(52) U.S. Cl.
USPC ........ 358/1.16; 358/1.15; 358/1.18; 235/375; 235/376; 235/462.01; 382/317

(58) Field of Classification Search
USPC ................. 358/1.13–1.18; 399/84; 382/317; 235/375, 376, 462.01

See application file for complete search history.

(56) References Cited

U.S. PATENT DOCUMENTS

| | | | | |
|---|---|---|---|---|
| 5,940,188 A | * | 8/1999 | Kurozasa | 358/436 |
| 7,599,084 B2 | * | 10/2009 | Mitani | 358/1.15 |
| 2003/0086706 A1 | * | 5/2003 | Kinjo | 396/420 |
| 2004/0252330 A1 | * | 12/2004 | Brown et al. | 358/1.15 |

FOREIGN PATENT DOCUMENTS

| JP | 8339302 | 12/1996 |
|---|---|---|
| JP | 2004160919 | 6/2004 |
| JP | 2004160920 | 6/2004 |

* cited by examiner

*Primary Examiner* — Dennis Dicker
(74) *Attorney, Agent, or Firm* — McCarter & English, LLP (57) ABSTRACT

A printer includes a connection port that connects an external storage device to the printer, a command input unit that inputs coded information or text-form information, and a processor that executes a command corresponding to coded information or text-form information inputted in the command input unit by using data stored in the external storage device connected to the connection port.

2 Claims, 10 Drawing Sheets

PRINTER THAT PRINTS CODED INFORMATION UNDER CONTROL OF A PROCESSOR

CROSS-REFERENCE TO RELATED APPLICATIONS

The present application claims priority from Japanese Patent Application No. JP 2010-074862, which was filed on Mar. 29, 2010, and Application No. 2010-285554, which was filed on Dec. 22, 2010, the disclosure of which is incorporated herein by reference in its entirety.

TECHNICAL FIELD

The disclosure relates to a printer that uses data stored in an external storage.

BACKGROUND

As is often the case with electric appliances such as printers, a new version application program may be read out from an external storage and stored in an internal storage thereof. In such a case, for instance, a previous version application program is removed from its original storage area and saved at other area so that its new version stored in an external storage is uploaded in the vacant area where the removed previous version was stored. Thereafter, in case a successful upload is completed, the previous version is deleted whereas in case the upload is not completed successfully, the previous version is returned to its original storage area (i.e., overwrite save of the new version).

Figure 10:
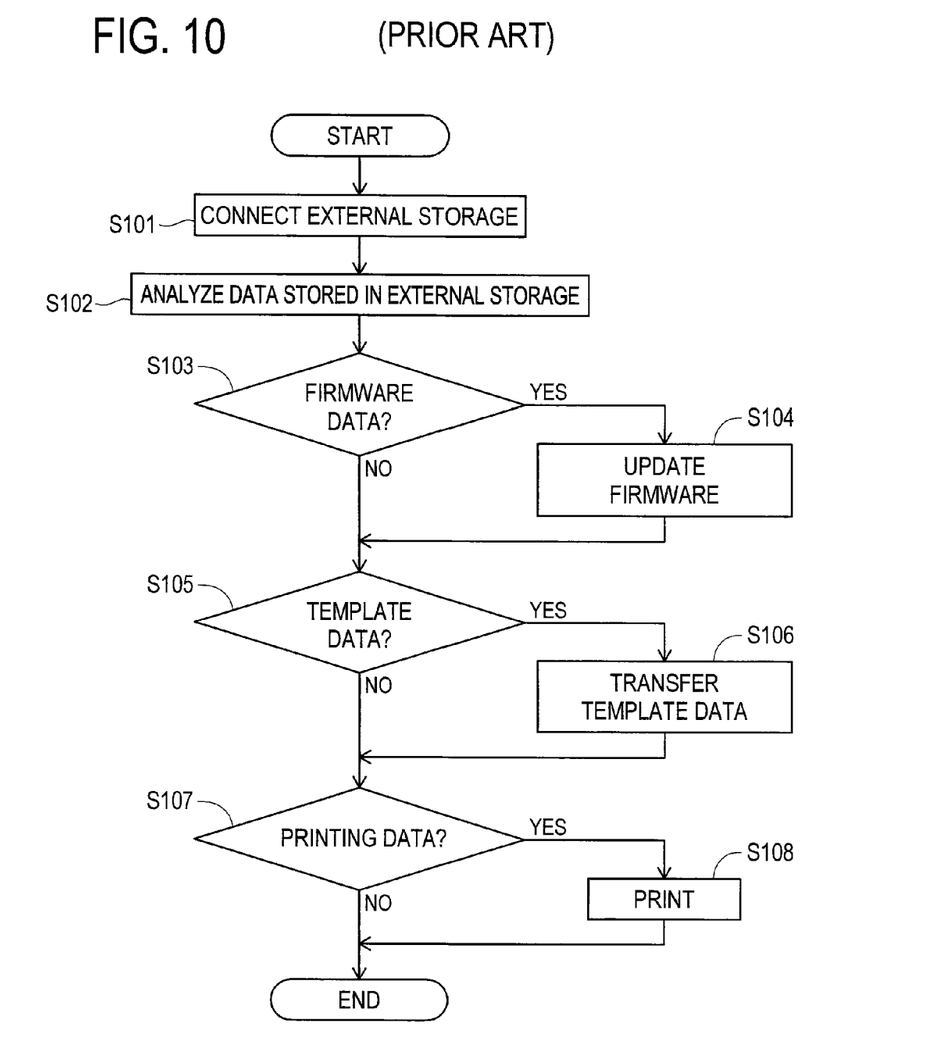
FIG. 10 is flowchart of a program for executing an operation using data stored in an external storage connected to a conventional printer.

Meanwhile, in a printer connected to an external storage, when each step which is updating of firmware, addition of template data, transfer of printing-data or the like is carried out by using data stored in the external storage, for example, manual operations are performed by an operation procedure of flowchart shown in FIG. 10.

More specifically, according to the flowchart of FIG. 10, a step of connecting an external storage to a printer is carried out (S101) at first. When the printer detects the connection with the external storage, a step of analyzing data stored in the external storage is carried out inside the printer (S102). In case data stored in the external storage currently connected to the printer includes firmware data (S103: YES), a step of updating the firmware (S104) is carried out along user's manual operations on the printer. In case the data in the external storage is not firmware data (S103: NO) but template data (S105: YES), a step of transferring the template data (S106) is carried out along user's manual operations on the printer. In case the data stored in the external storage is not template data (S105: NO) but printing data (S107: YES), a step of printing out the printing data (S108) is carried out along user's manual operations on the printer. In case the data stored in the external storage is not printing data (S107: NO), the printer terminates the steps of using data stored in the external storage.

In this connection, even if a display unit is employed, if the display unit is capable of indicating quite limited amount of information at a time, such a conventional printer is very inconvenient for manual operations for users. That is, when an external storage is connected to the above such printer and data stored in the external storage connected to the printer is used, the printer needs to indicate guidance of complicated manual operation procedure in the display unit that is capable of indicating limited amount of information at a time. Even if the printer employs an operation device thereto, if executable operations with the employed operation device are limited to simple ones, it is very difficult for a user to perform complicated manual operations in steps using data stored in an external storage connected to the printer.

SUMMARY

The disclosure has been made to solve the above-described problem. Also, the object of the disclosure is to provide a printer capable of performing easily manual operations in steps using data stored in a external storage connected to the printer even if the printer does not employ a display unit or even if the printer employs an input unit and a display unit, but is inconvenient for manual operations to be performed by using data stored in the external storage device due to design restriction of both the input unit and the display unit.

To achieve the purpose of the disclosure, according to a first aspect of the disclosure, there is provided a printer comprising: a connection port that connects an external storage device to the printer; a command input unit that inputs coded information or text-form information; and a processor that executes a command corresponding to coded information or text-form information inputted in the command input unit by using data stored in the external storage device connected to the connection port.

DETAILED DESCRIPTION

1. External Configuration of the Disclosure

Figure 1:
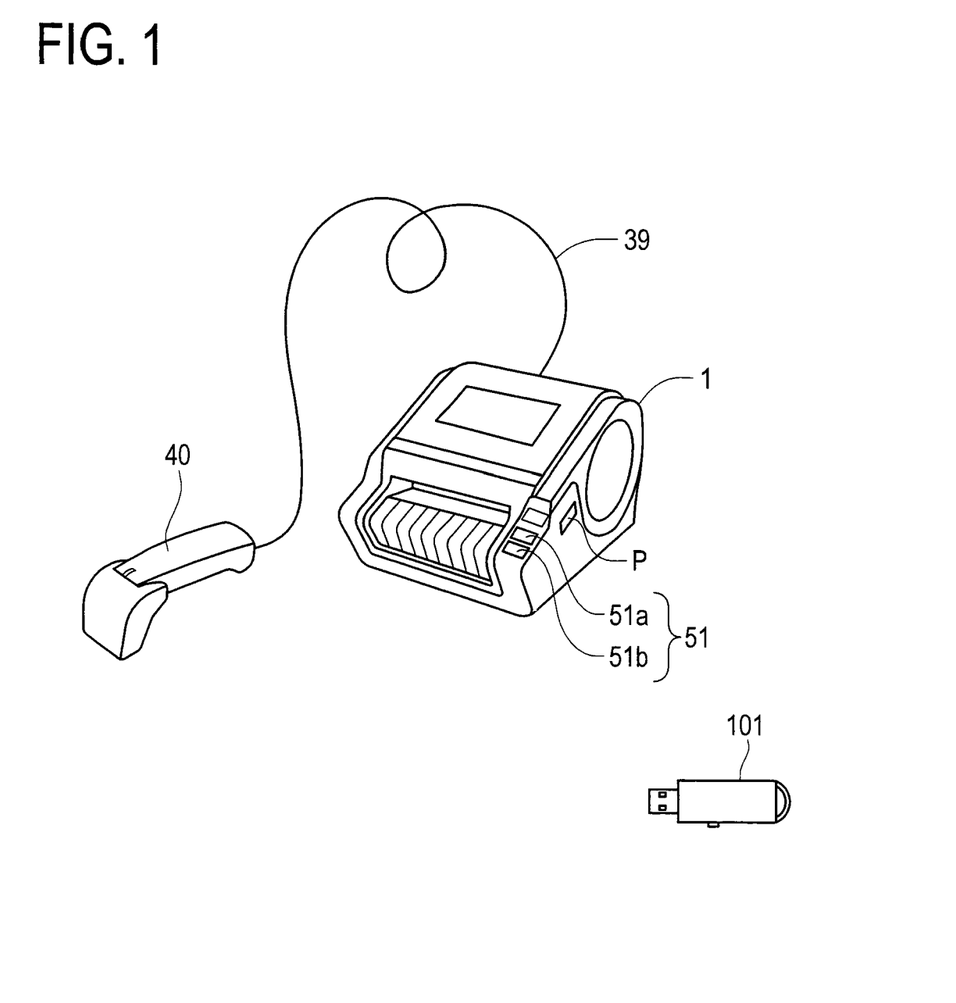
FIG. 1 is an external perspective view of a printer directed to an embodiment of the disclosure.

A detailed description of an exemplary embodiment of a printer directed to the disclosure will be described by referring to drawings. As shown in FIG. 1, the printer 1 of the present embodiment includes operation keys 51, a USB port P for a USB flash drive 101, a reader 40 connected to the printer 1 with a cable 39, etc. A cut key 51*a*, a feed key 51*b*, etc. constitute the operation keys 51. In the present embodiment, a bar code reader is employed as an example of the reader 40.

2. Internal Configuration of the Disclosure

Next, the internal configuration of the printer 1 of the present embodiment will be described by referring to FIG. 2.

Figure 2:
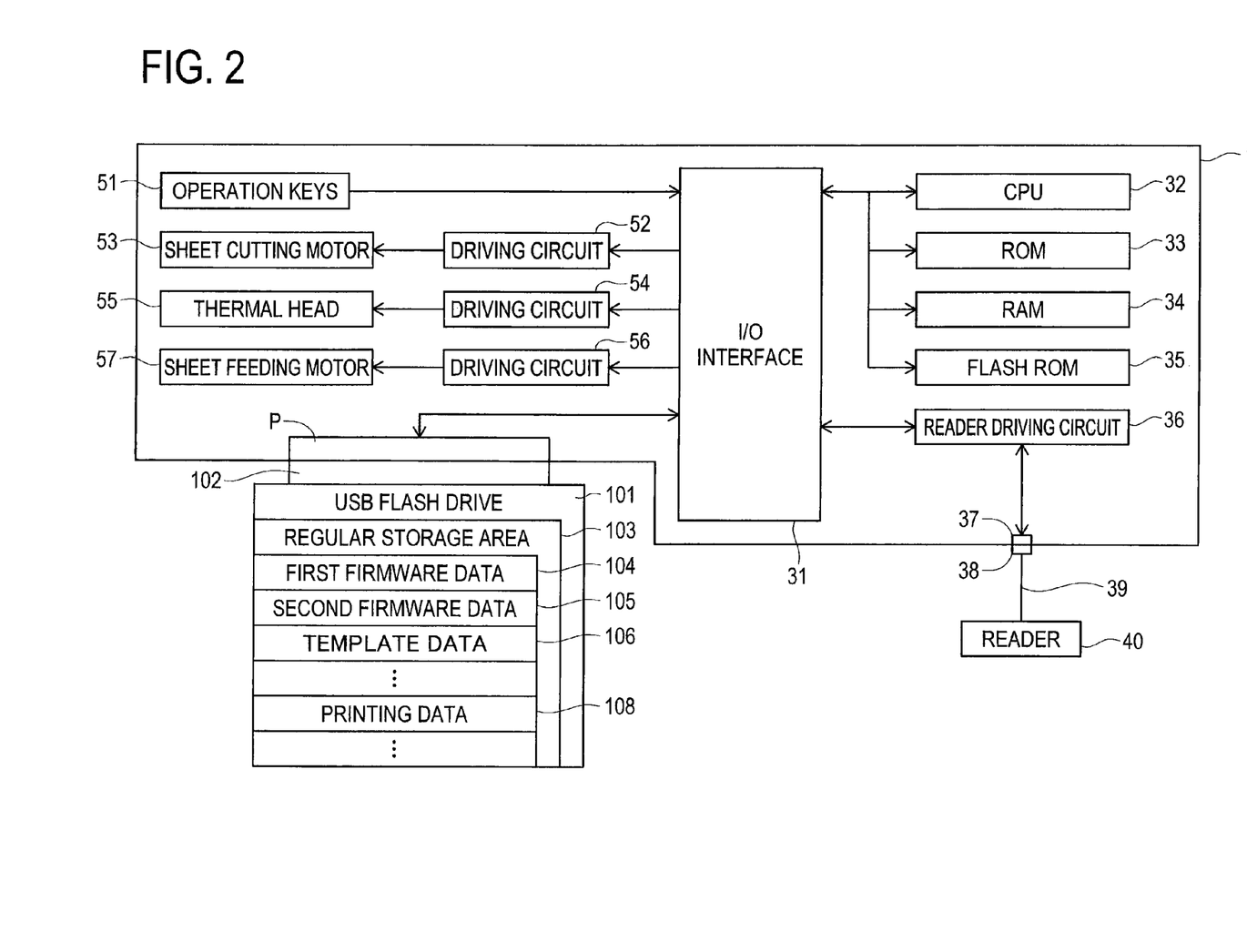
FIG. 2 is a block diagram showing an internal configuration of the printer.

As shown in FIG. 2, in the printer 1 of the present embodiment, the operation keys 51, three driving circuits 52, 54, 56, the USB port P, etc. are connected to an input/output interface 31.

The operation keys 51 allows a user to input to a below mentioned CPU 32 a control signal for cutting or feeding a printing medium. In the present embodiment, as already mentioned, the cut key 51a and the feed key 51b, etc. are employed as the operation keys 51. A sheet cutting motor 53 is connected to the driving circuit 52 that drives the sheet cutting motor 53 when a printing medium is to be cut. A thermal head 55 is connected to the driving circuit 54 that drives the thermal head 55 when printing data is to be printed on a printing medium. A sheet feeding motor 57 is connected to the driving circuit 56 that drives the sheet feeding motor 57 when a printing medium is to be fed outside. The USB port P is employed so as to allow insertion and removal of a connector 102 of the USB flash drive 101. More specifically, by inserting the connector 102 of the USB flash drive 101 into the USB port P, the USB flash drive 101 is connected to the printer 1 of the present embodiment.

In the USB flash drive 101, a regular storage area 103 is arranged. In the regular storage area 103 shown in FIG. 2, there are assigned an area 104 to store first firmware, an area 105 to store second firmware, an area 106 to store template data, an area 108 to store printing data, etc.

In the printer 1 of the present embodiment, the CPU 32, a ROM 33, a RAM 34, a flash ROM 35, a reader driving circuit 36, etc. are connected to the input/output interface 31. The CPU 32 serves to execute various programs to be described later and contains a cache memory etc. to store control programs other than printing-related control programs. The CPU 32 executes following printing-related control programs stored in the flash ROM 35 so as to drive the driving circuits 52, 54 and 56. Thereby, following printing data stored in the RAM 34 are printed on a printing medium and the printed printing medium is ejected outside.

Further, the ROM 33 stores control programs other than printing-related control programs. The RAM 34 serves a work area when the CPU 32 executes various control programs, as well as a storage area to store printing data.

The flash ROM 35 stores printing-related control programs, management tables, etc. and includes a regular storage area and the like. In the regular storage area, there are assigned areas to store various data such as firmware data, template data, history information data, etc. Particularly, the history information data includes data relating to the number of printings, printing length, and times to cut of printing media, etc.

A port 37 is connected to the reader driving circuit 36. The port 37 allows insertion and removal of a connector 38 that is attached to a front end of the cable 39 of the reader 40. Therefore, once the connector 38 attached to the cable 39 of the reader 40 is inserted in the port 37, the reader 40 can be connected to the printer 1 directed to the present embodiment. That is, as long as the reader 40 is in a connected state, the reader driving circuit 36 drives the reader 40 when the reader 40 is to be used.

3. First Operation of the Disclosure

Figure 3:
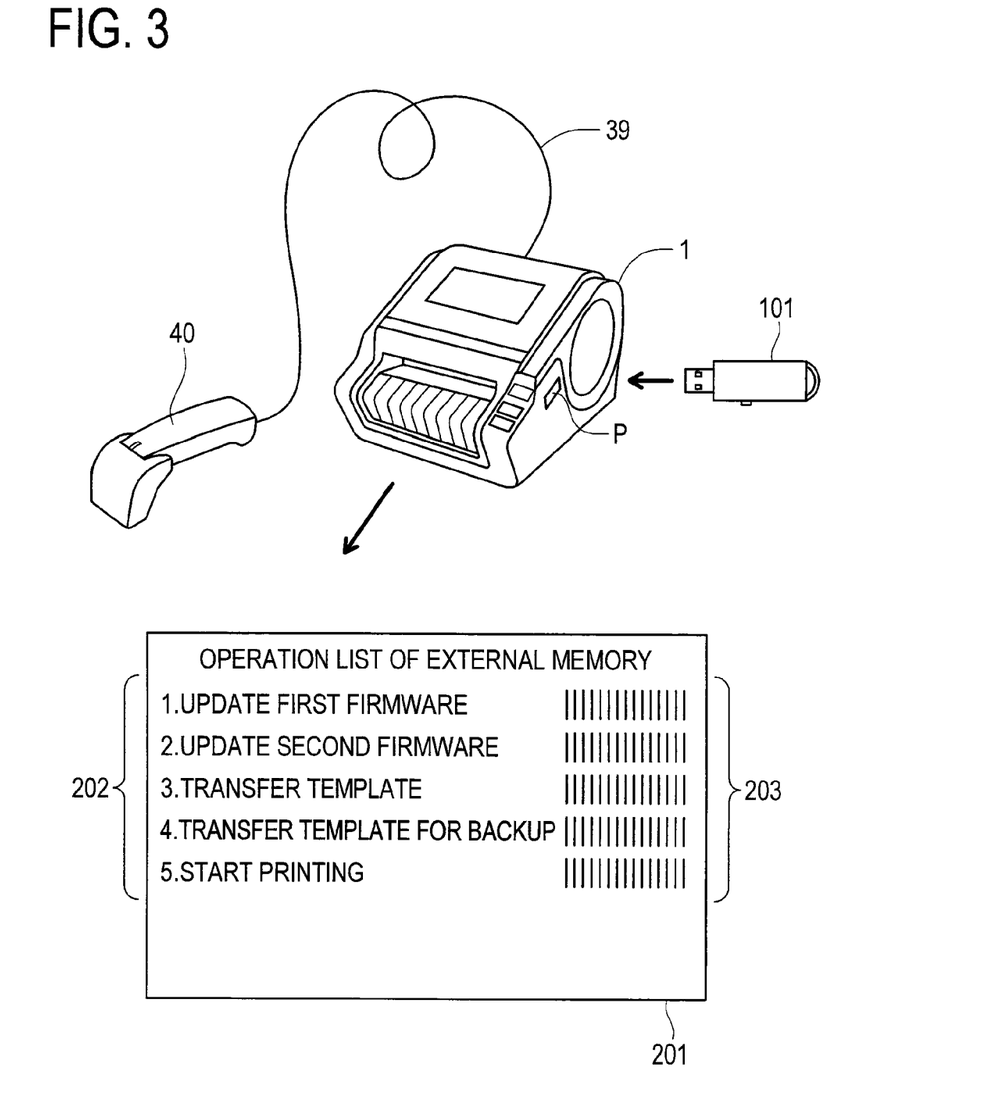
FIG. 3 is a perspective view for externally illustrating a first operation and a second operation of the printer.

Next, there will be described on a first operation of the printer 1 directed to the present embodiment by referring to FIG. 3 and FIG. 4. As shown in FIG. 3, when the connector 102 of the USB flash drive 101 is inserted in the USB port P, the printer 1 of the present embodiment carries out printing on a printing medium 201 by a manner that coded information 203 and text-form information 202 are printed on the printing medium 201 in a layout associated with each other. Specifically, the text-form information 202 and the coded information 203 are executed by using data stored in the USB flash drive 101 and/or data stored in the flash ROM 35.

As shown in FIG. 2, in the regular storage area 103 of the USB flash drive 101 connected to the printer 1 of the present embodiment, first firmware data, second firmware data, template data and printing data are stored in the areas 104, 105, 106 and 108, respectively. Template data and the like are also stored in the regular storage area of the flash ROM 35 of the printer 1 of the present embodiment. Accordingly, on the printing medium 201 shown in FIG. 3, "1. UPDATE FIRST FIRMWARE", "2. UPDATE SECOND FIRMWARE", "3. TRANSFER TEMPLATE", "4. TRANSFER TEMPLATE FOR BACKUP" and "5. START PRINTING" are printed as an "OPERATION LIST OF EXTERNAL MEMORY" listing text-form information 202. On each one side of those text-form information 202, associated coded information 203 is indicated. In the present embodiment, a bar code reader is employed as the example of reader 40. As specific form of coded information 203, bar codes are printed on the printing medium 201, accordingly.

Figure 4:
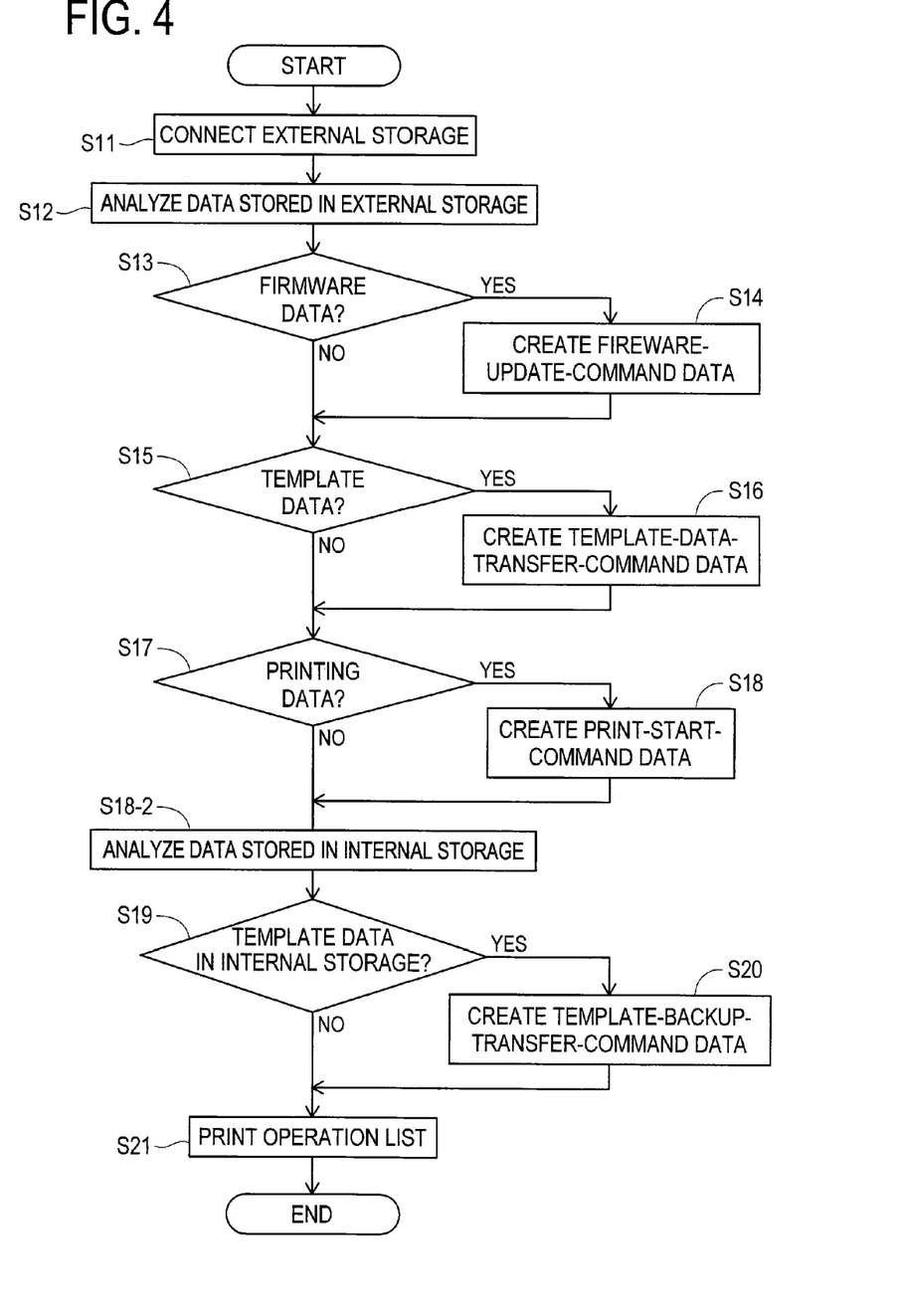
FIG. 4 is a flowchart of a program for executing the first operation of the printer.

As shown in FIG. 4, in the printer 1 of the present embodiment, a step of connecting an external storage to a printer is carried out at S11, at first. Specifically, when the USB flash drive 101 is connected to the USB port P, the CPU 32 detects USB connection of the USB flash drive 101 and subsequently shifts the step to S12.

At S12, a step of analyzing data stored in the USB flash drive 101 is carried out. Specifically, the CPU 32 analyzes data stored in the regular storage area 103 of the USB flash drive 101 connected to the printer 1 of the present embodiment. Thereafter, the CPU 32 shifts the step to S13.

At S13, the CPU 32 detects whether or not firmware data is included among the data stored in the regular storage area 103 of the USB flash drive 101 analyzed at S12. In case firmware data is included among the data stored in the regular storage area 103 of the USB flash drive 101 analyzed at S12 (S13: YES), the CPU 32 shifts the step to S14.

At S14, a step of creating firmware-update-command data is carried out. Specifically, the CPU 32 creates coded information 203 which is a command for making the CPU 32 itself update firmware, and creates associated text-form information 202 which indicates updating of the firmware in a form of text. Thereafter, the CPU 32 shifts the step to S15.

In the specific example shown with FIG. 2 and FIG. 3, first firmware and second firmware are included among the data stored in the regular storage area 103 of the USB flash drive 101 analyzed at S12 (refer to FIG. 2). Therefore, the CPU 32 creates two text-form information 202, namely, "1. UPDATE FIRST FIRMWARE" and "2. UPDATE SECOND FIRMWARE", and creates respectively-associated two coded information 203 in a form of bar code (refer to FIG. 3).

On the other hand, in case firmware data is not included among the data stored in the regular storage area 103 of the USB flash drive 101 analyzed at S12 (S13: NO), the CPU 32 shifts the step to S15. At S15, the CPU 32 detects whether or not template data is included among the data stored in the regular storage area 103 of the USB flash drive 101 analyzed at S12. In case template data is included among the data stored in the regular storage area 103 of the USB flash drive 101 analyzed at S12 (S15: YES), the CPU 32 shifts the step to S16.

At S16, a step of creating template-data-transfer-command data is carried out. Specifically, the CPU 32 creates coded information 203 which is a command for making the CPU 32 itself transfer template data and creates associated text-form information 202 which indicates transferring of template data in a form of text. Thereafter, the CPU 32 shifts the step to S17.

In the specific example shown with FIG. 2 and FIG. 3, template data is included among the data stored in the regular storage area 103 of the USB flash drive 101 analyzed at S12 (refer to FIG. 2). Therefore, the CPU 32 creates text-form information 202, namely, "3. TRANSFER TEMPLATE", and creates coded information 203 in a form of bar code (refer to FIG. 3).

On the other hand, at S15, in case template data is not included among the data stored in the regular storage area 103 of the USB flash drive 101 analyzed at S12 (S15: NO), the CPU 32 shifts the step to S17. At S17, the CPU 32 detects whether or not printing data is included among the data stored in the regular storage area 103 of the USB flash drive 101 analyzed at S12. In case printing data is included among the data stored in the regular storage area 103 of the USB flash drive 101 analyzed at S12 (S17: YES), the CPU 32 shifts the step to S18.

At S18, a step of creating print-start-command data is carried out. Specifically, the CPU 32 creates coded information 203 which is a command for making the CPU 32 itself start printing and creates associated text-form information 202 which indicates starting of printing in a form of text. Thereafter, the CPU 32 shifts the step to S18-2. In case printing data is not included among the data stored in the regular storage area 103 of the USB flash drive 101 analyzed at S12 (S17: NO), the CPU 32 shifts the step to S18-2.

At S18-2, a step of analyzing data stored in the flash ROM 35 is carried out. Specifically, the CPU 32 analyzes data stored in the regular storage area of the flash ROM 35. Thereafter the CPU 32 shifts the step to S19.

At S19, the CPU 32 detects whether or not template data is included among the data stored in the flash ROM 35 analyzed at S18-2. In case template data is included among the data stored in the flash ROM 35 analyzed at S18-2 (S19: YES), the CPU 32 shifts the step to S20.

At S20, a step of creating template-backup-transfer-command data is carried out. Specifically at S20, the CPU 32 creates coded information 203 which is a command for making the CPU 32 itself backup for transferring of template and creates associated text-form information 202 which indicates backup-transferring of template in a form of text. Thereafter, the CPU 32 shifts the step to S21.

On the other hand, in case template data is not included among the data stored in the flash ROM 35 analyzed at S18-2, (S19: NO), the CPU 32 shifts the step to S21.

At S21, a step of printing an operation list is carried out. Specifically, text-form information 202 and respectively-associated coded information 203, which are created on the basis of S14, S16, S18 and S20, are developed in the RAM 34 by the CPU 32, and subsequently are printed out by the CPU 32. Thereafter, the CPU 32 terminates the program.

Consequently, in case of the specific example shown with FIG. 2 and FIG. 3, on the printing medium 201 shown in FIG. 3, "1. UPDATE FIRST FIRMWARE", "2. UPDATE SECOND FIRMWARE", "3. TRANSFER TEMPLATE", "4. TRANSFER TEMPLATE FOR BACKUP" and "5. START PRINTING" are printed as the "OPERATION LIST OF EXTERNAL MEMORY" listing text-form information 202. On each one side of those text-form information 202, associated coded information 203 is indicated.

4. Second Operation of the Disclosure

Next, there will be described on a second operation of the printer 1 directed to the present embodiment by referring to FIG. 3 and FIG. 9. As shown in FIG. 3, when the connector 102 of the USB flash drive 101 is inserted in the USB port P, the printer 1 of the present embodiment carries out printing on the printing medium 201 by a manner that coded information 203 and text-form information 202 are printed on the printing medium 201 in a layout associated with each other. Specifically, the text-form information 202 and the coded information 203 are executed by using data stored in the USB flash drive 101 and/or data stored in the flash ROM 35.

As shown in FIG. 2, in the regular storage area 103 of the USB flash drive 101 connected to the printer 1 of the present embodiment, first firmware data, second firmware data, template data and printing data are stored in the areas 104, 105, 106 and 108, respectively. Template data and the like are also stored in the regular storage area of the flash ROM 35 of the printer 1 of the present embodiment. Accordingly, when predetermined conditions are satisfied, as shown on the printing medium 201 of FIG. 3, "1. UPDATE FIRST FIRMWARE", "2. UPDATE SECOND FIRMWARE", "3. TRANSFER TEMPLATE", "4. TRANSFER TEMPLATE FOR BACKUP" and "5. START PRINTING" are printed as an "OPERATION LIST OF EXTERNAL MEMORY" listing text-form information 202. On each one side of those text-form information 202, associated coded information 203 is indicated. In the present embodiment, a bar code reader is employed as the example of reader 40. As specific form of coded information 203, bar codes are printed on the printing medium 201, accordingly.

More specifically, superficial operation according to the second operation of the printer 1 of the present embodiment is the same as superficial operation according to the first operation if the predetermined conditions are satisfied. Contrarily, if the predetermined conditions are not satisfied, a printing medium is different from the printing medium 201 shown in FIG. 3. At least any one of the following text-form information is not printed on the printing medium that is the "OPERATION LIST OF EXTERNAL MEMORY" listing text-form information 202 together with associated coded information. "1. UPDATE FIRST FIRMWARE", "2. UPDATE SECOND FIRMWARE", "3. TRANSFER TEMPLATE", "4. TRANSFER TEMPLATE FOR BACKUP" and "5. START PRINTING" are the following text-form information.

Further, in case that the first operation is performed with the printer 1 of the present embodiment, the second operation will not be performed. Vice versa, in case that the second operation is performed with the printer 1 of the present embodiment, the first operation will not be performed.

Figure 9:
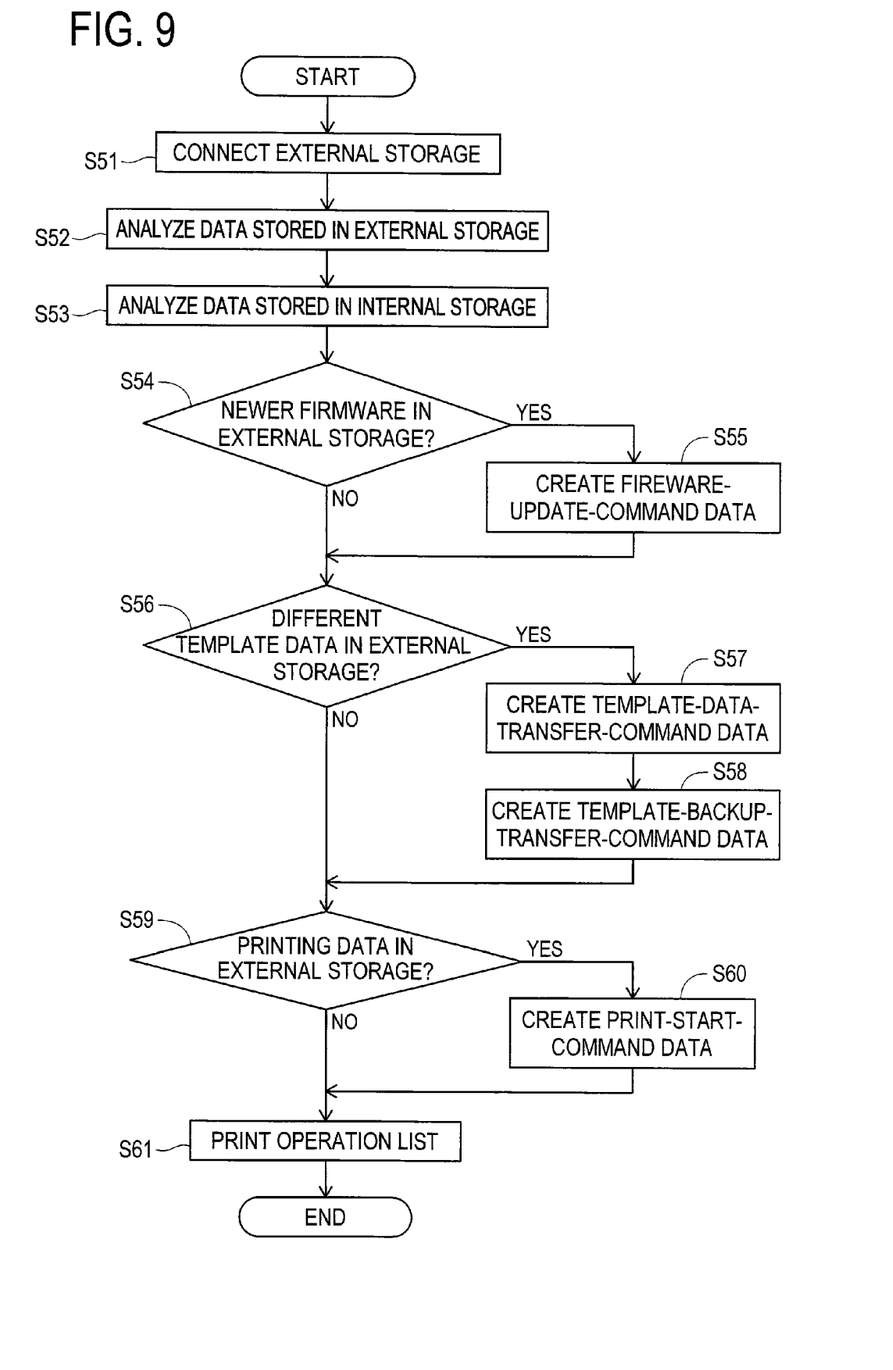
FIG. 9 is a flowchart of a program for executing the second operation of the printer directed to the embodiment of the disclosure.

As shown in FIG. 9, in the printer 1 of the present embodiment, a step of connecting an external storage to a printer is carried out at S51, at first. Specifically, when the USB flash drive 101 is connected to the USB port P, the CPU 32 detects USB connection of the USB flash drive 101 and subsequently shifts the step to S52.

At S52, a step of analyzing data stored in the USB flash drive 101 is carried out. Specifically, the CPU 32 analyzes data stored in the regular storage area 103 of the USB flash drive 101 connected to the printer 1 of the present embodiment. Thereafter, the CPU 32 shifts the step to S53.

At S53, a step of analyzing data stored in the flash ROM 35 is carried out. Specifically, the CPU 32 analyzes data stored in the regular storage area of the flash ROM 35. Thereafter the CPU 32 shifts the step to S54.

At S54, the CPU 32 detects whether or not newer firmware data is included among the data stored in the regular storage area 103 of the USB flash drive 101 analyzed at S52 by comparing both the data stored in the USB flash drive 101 analyzed at S52 and the data stored in the flash ROM 35 analyzed at S53. In case newer firmware data is included among the data stored in the regular storage area 103 of the USB flash drive 101 analyzed at S52 (S54: YES), the CPU 32 shifts the step to S55.

At S55, a step of creating firmware-update-command data is carried out. Specifically, the CPU 32 creates coded information 203 which is a command for making the CPU 32 itself update firmware, and creates associated text-form information 202 which indicates updating of the firmware in a form of text. Thereafter, the CPU 32 shifts the step to S56.

In the specific example shown with FIG. 2 and FIG. 3, first firmware and second firmware are included among the data stored in the regular storage area 103 of the USB flash drive 101 analyzed at S52 (refer to FIG. 2 above-described). Therefore, in case the first firmware and the second firmware are newer than the data (firmware data) stored in the flash ROM 35 analyzed at S53, the CPU 32 creates two text-form information 202, namely, "1. UPDATE FIRST FIRMWARE" and "2. UPDATE SECOND FIRMWARE", and creates respectively-associated two coded information 203 in a form of bar code (refer to FIG. 3 above-described).

On the other hand, in case newer firmware data is not included among the data stored in the regular storage area 103 of the USB flash drive 101 analyzed at S52 (S54: NO), the CPU 32 shifts the step to S56. At S56, the CPU 32 detects whether or not different template data is included among the data stored in the regular storage area 103 of the USB flash drive 101 analyzed at S52 by comparing both the data stored in the USB flash drive 101 analyzed at S52 and the data stored in the flash ROM 35 analyzed at S53. In case different template data is included among the data stored in the regular storage area 103 of the USB flash drive 101 analyzed at S52 (S56: YES), the CPU 32 shifts the step to S57.

At S57 a step of creating template-data-transfer-command data is carried out. Specifically, the CPU 32 creates coded information 203 which is a command for making the CPU 32 itself transfer template data and creates associated text-form information 202 which indicates transferring of template data in a form of text. Thereafter, the CPU 32 shifts the step to S58.

In the specific example shown with FIG. 2 and FIG. 3, template data is included among the data stored in the regular storage area 103 of the USB flash drive 101 analyzed at S52 (refer to FIG. 2 above-described). Therefore, in case the template data differs in comparison with the data (template data) stored in the flash ROM 35 analyzed at S53, the CPU 32 creates text-form information 202, namely, "3. TRANSFER TEMPLATE", and creates coded information 203 in a form of bar code (refer to FIG. 3 above-described).

At S58, a step of creating template-backup-transfer-command data is carried out. Specifically at S58, the CPU 32 creates coded information 203 which is a command for making the CPU 32 itself backup for transferring of template and creates associated text-form information 202 which indicates backup-transferring of template in a form of text. Thereafter, the CPU 32 shifts the step to S59.

In the specific example shown with FIG. 2 and FIG. 3, template data is included among the data stored in the regular storage area 103 of the USB flash drive 101 analyzed at S52 (refer to FIG. 2 above-described). Therefore, in case the template data differs in comparison with the data (template data) stored in the flash ROM 35 analyzed at S53, the CPU 32 creates text-form information 202, namely, "4. TRANSFER TEMPLATE FOR BACKUP", and creates coded information 203 in a form of bar code (refer to FIG. 3 above-described).

On the other hand, at S56, in case different template data is not included among the data stored in the regular storage area 103 of the USB flash drive 101 analyzed at S52 (S56: NO), the CPU 32 shifts the step to S59. At S59, the CPU 32 detects whether or not printing data is included among the data stored in the regular storage area 103 of the USB flash drive 101 analyzed at S52. In case printing data is included among the data stored in the regular storage area 103 of the USB flash drive 101 analyzed at S52 (S59: YES), the CPU 32 shifts the step to S60.

At S60, a step of creating print-start-command data is carried out. Specifically, the CPU 32 creates coded information 203 which is a command for making the CPU 32 itself start printing and creates associated text-form information 202 which indicates starting of printing in a form of text. Thereafter, the CPU 32 shifts the step to S61. In case printing data is not included among the data stored in the regular storage area 103 of the USB flash drive 101 analyzed at S52 (S59: NO), the CPU 32 shifts the step to S61.

At S61, a step of printing an operation list is carried out. Specifically, text-form information 202 and respectively-associated coded information 203, which are created on the basis of S55, S57, S58 and S60, are developed in the RAM 34 by the CPU 32, and subsequently are printed out by the CPU 32. Thereafter, the CPU 32 terminates the program.

Consequently, in case predetermined conditions are satisfied, namely, in case all of the above-described steps S55, S57, S58 and S60 have been carried out, for instance, with respect to the specific example shown with FIG. 2 and FIG. 3, "1. UPDATE FIRST FIRMWARE", "2. UPDATE SECOND FIRMWARE", "3. TRANSFER TEMPLATE", "4. TRANSFER TEMPLATE FOR BACKUP" and "5. START PRINTING" are printed as the "OPERATION LIST OF EXTERNAL MEMORY" listing text-form information 202. On each one side of those text-form information 202, associated coded information 203 is indicated.

Alternatively, in case predetermined conditions are not satisfied, specifically, in case the above-described step S60 has not been carried out whereas the above-described steps S55, S57 and S58 have been carried out, a printing medium is different from the printing medium 201 shown in FIG. 3. "1. UPDATE FIRST FIRMWARE", "2. UPDATE SECOND FIRMWARE", "3. TRANSFER TEMPLATE", and "4. TRANSFER TEMPLATE FOR BACKUP" are printed as the "OPERATION LIST OF EXTERNAL MEMORY" listing text-form information 202. On each one side of those text-form information 202, associated coded information 203 is indicated. That is, the text-form information 202 of "5. START PRINTING" is not printed on the printing medium that is the "OPERATION LIST OF EXTERNAL MEMORY" listing text-form information 202 together with the associated coded information 203.

5. Third Operation of the Disclosure

Figure 5:
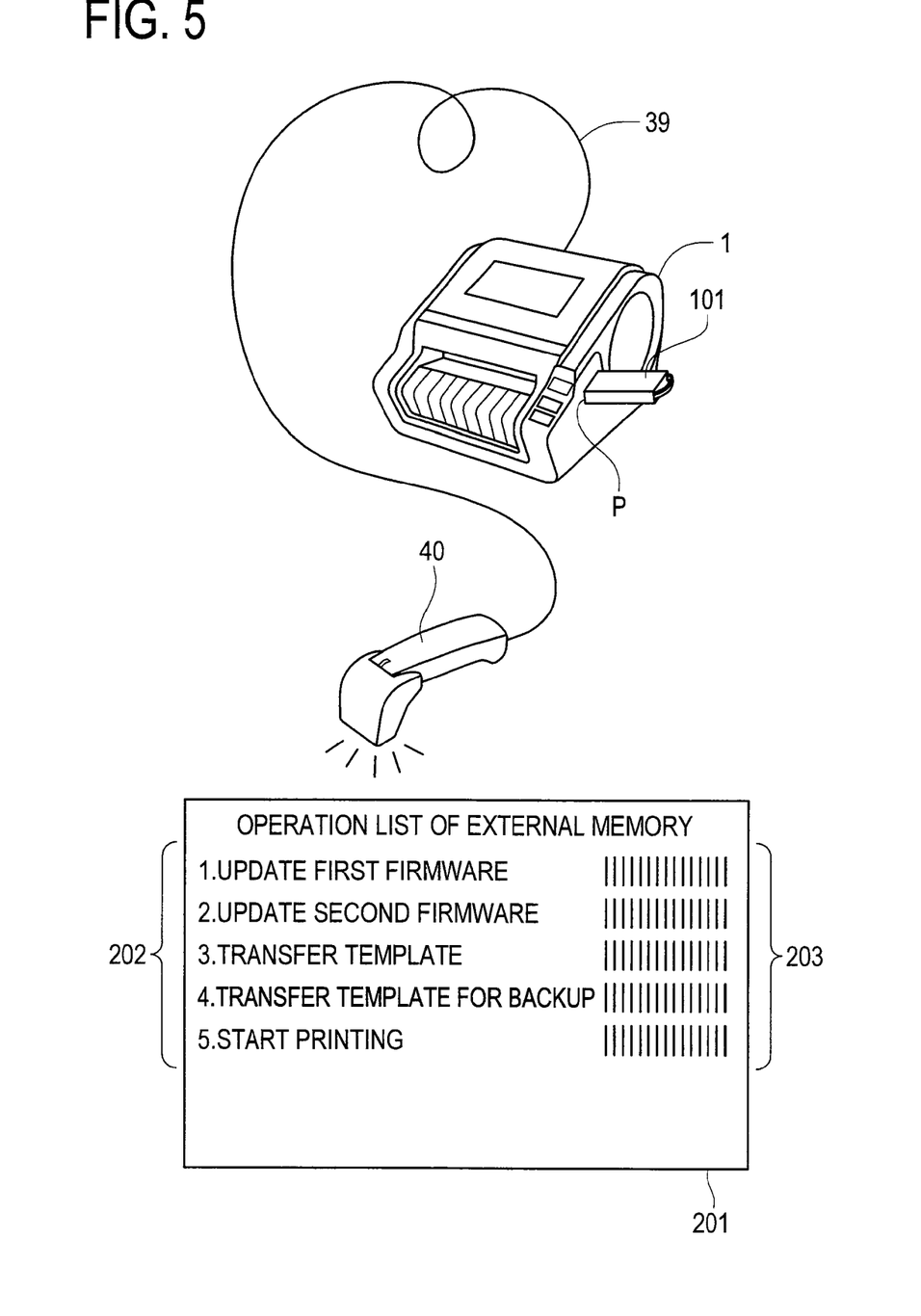
FIG. 5 is a perspective view for externally illustrating a third operation of the printer.

Next, there will be described on a third operation of the printer 1 of the present embodiment by referring to FIG. 5 and FIG. 6. As shown in FIG. 5, manual operation to read one of coded information 203 among "OPERATION LIST OF EXTERNAL MEMORY" printed on the printing medium 201 is performed with the reader 40 in a state that the connector 102 of the USB flash drive 101 is inserted in the USB port P of the printer 1 of the present embodiment. Consequently, an operation indicated in a form of text with the associated text-form information 203 by the side of the coded information 203 read by the reader 40 is performed. Specifically, associated text-form information 202 and coded information 203 indicate an operation performed by using data stored in the USB flash drive 101 connected to the printer 1 of the present embodiment and/or data stored in the regular storage area of the flash ROM 35.

Figure 6:
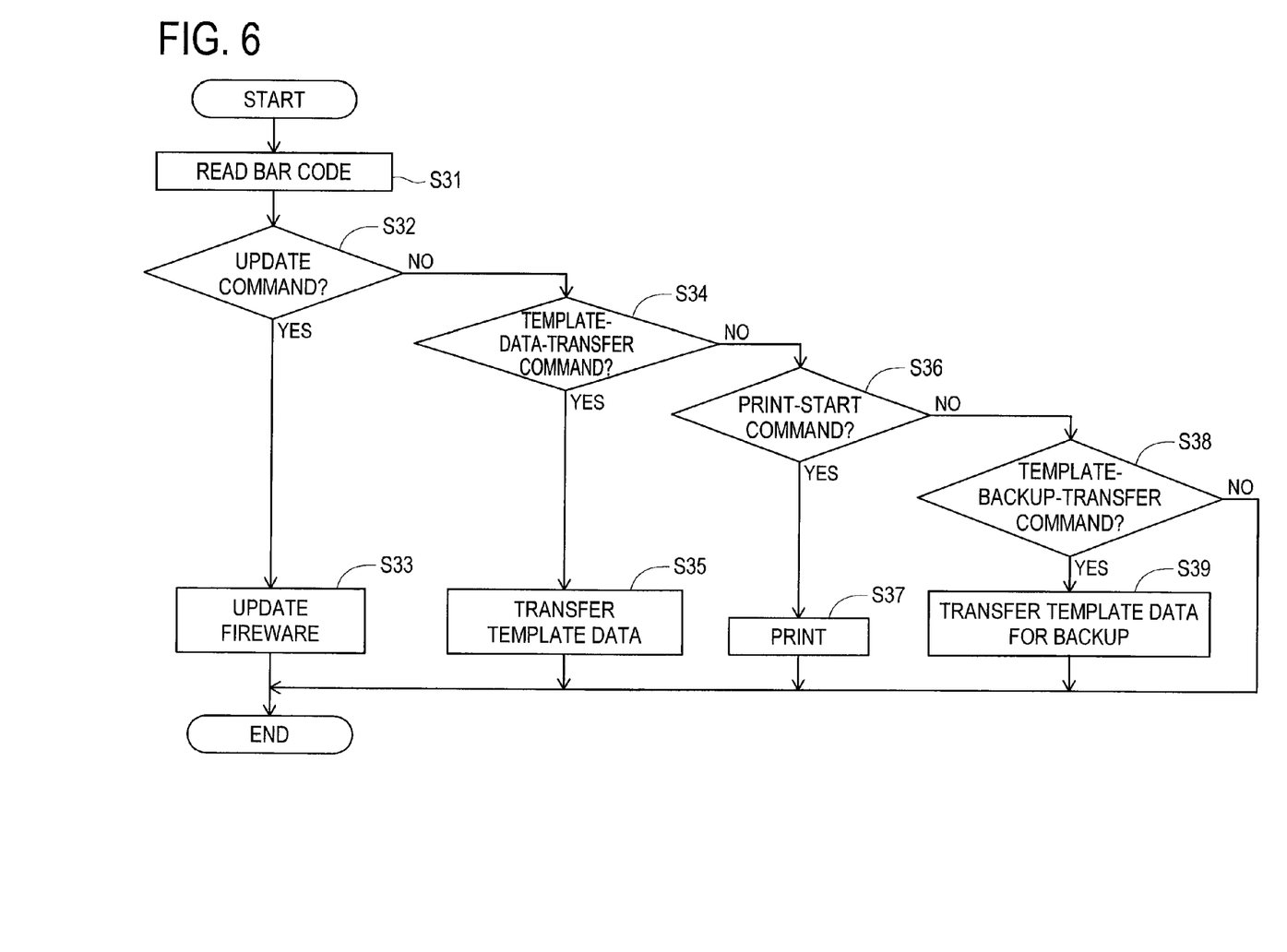
FIG. 6 is a flowchart of a program for executing the third operation of the printer.

As shown in FIG. 6, with respect to the printer 1 of the present embodiment, a step of reading a bar code is firstly carried out at S31. Specifically, at S31, the CPU 32 receives a command directed to coded information 203 manually read by a user with the reader 40. Thereafter, the CPU 32 shifts the step to S32.

At S32, the CPU 32 detects whether or not the command the CPU 32 has received at S31 is an update command. In case the command the CPU 32 has received at S31 is an update command (S32: YES), the CPU 32 shifts the step to S33.

At S33, a step of updating firmware is carried out. Specifically, at S33, the CPU 32 overwrites firmware data stored in the flash ROM 35 of the printer 1 of the present embodiment by using firmware data stored in the regular storage area 103 of the USB flash drive 101 connected to the printer 1 of the present embodiment. Thereafter, the CPU 32 terminates this program.

In the specific example shown with FIG. 2 and FIG. 5, in case the command the CPU 32 has received at S31 is an update command corresponding to text-form information 202 of "1. UPDATE FIRST FIRMWARE", the CPU 32 overwrites the firmware data stored in the flash ROM 35 of the printer 1 of the present embodiment and saves in the flash ROM 35 the first firmware data stored in the regular storage area 103 of the USB flash drive 101 connected to the printer 1 of the present embodiment. Also, in case the command the CPU 32 has received at S31 is an update command corresponding to text-form information 202 of "2. UPDATE SECOND FIRMWARE", the CPU 32 overwrites firmware data stored in the flash ROM 35 of the printer 1 of the present embodiment and saves in the flash ROM 35 the second firmware data stored in the regular storage area 103 of the USB flash drive 101 connected to the printer 1 of the present embodiment.

On the other hand, in case the command the CPU 32 has received at S31 is not an update command (S32: NO), the CPU 34 shifts the step to S34. At S34, the CPU 32 detects whether or not the command the CPU 32 has received at S31 is a template-data-transfer command. In case the command the CPU 32 has received at S31 is a template-data-transfer command (S34: YES), the CPU 32 shifts the step to S35.

At S35, a step of transferring template data is carried out. Specifically, at S35, the CPU 32 writes template data in the flash ROM 35 of the printer 1 of the present embodiment by using template data stored in the regular storage area 103 of the USB flash drive 101 connected to the printer 1 of the present embodiment. Thereafter, the CPU 32 terminates this program.

In the specific example shown with FIG. 2 and FIG. 5, in case the command the CPU 32 has received at S31 is a template-data-transfer command corresponding to text-form information 202 of "3. TRANSFER TEMPLATE", the CPU 32 writes and adds in the flash ROM 35 of the printer 1 of the present embodiment the template data stored in the regular storage area 103 of the USB flash drive 101 connected to the printer 1 of the present embodiment.

On the other hand, in case the command the CPU 32 has received at S31 is not a template-data-transfer command (S34: NO), the CPU 32 shifts the step to S36. At S36, the CPU 32 detects whether or not the command the CPU 32 has received at S31 is a print-start command. In case the command the CPU 32 has received at S31 is a print-start command (S36: YES), the CPU 32 shifts the step to S37.

At S37, a step of printing is carried out. Specifically, at S37, the CPU 32 uses printing data stored in the regular storage area 103 of the USB flash drive 101 connected to the printer 1 of the present embodiment and prints out the printing data on a printing medium. Thereafter, the CPU 32 terminates this program.

In the specific example shown with FIG. 2 and FIG. 5, in case the command the CPU 32 has received at S31 is a print-start command corresponding to text-form information 202 of "5. START PRINTING", the CPU 32 gets the printing data, which are stored in the regular storage area 103 of the USB flash drive 101 connected to the printer 1 of the present embodiment, developed at the RAM 34 of the printer 1 of the present embodiment and subsequently prints the thus developed printing data on a printing medium.

On the other hand, in case the command the CPU 32 has received at S31 is not a print-start command (S36: NO), the CPU 32 shifts the step to S38. At S38, the CPU 32 detects whether or not the command the CPU 32 has received at S31 is a template-backup-transfer command. In case the command the CPU 32 has received at S31 is not a template-backup-transfer command (S38: NO), the CPU 32 terminates this program. On the other hand, in case the command the CPU 32 has received at S31 is a template-backup-transfer command (S38: YES), the CPU 32 shifts the step to S39.

At S39, a step of transferring template data for backup is carried out. Specifically, at S39, the CPU 32 transfers the template data stored in the regular storage area of the flash ROM 35 of the printer 1 of the present embodiment to the regular storage area 103 of the USB flash drive 101 connected to the printer 1 of the present embodiment for backup so as to additionally write the template data in the regular storage area 103 of the USB flash drive 101. Thereafter, the CPU 32 terminates this program.

6. Summary

The printer 1 of the present embodiment does not employ a display unit. However, as described in detail (refer to FIG. 5), the printer 1 of the present embodiment is configured to allow a user to perform manual operation using the reader 40 in the third operation so as to read coded information 203 printed on the printing medium 201 in the first operation or the second operation. Thereafter, the CPU 32 executes, by using the data stored in the USB flash drive 101 connected to the USB port P and/or the data stored in the flash ROM 35 (refer to FIG. 6), a command corresponding to the coded information 203 read by the reader 40. Thereby, there can easily be performed manual operations in steps using the data stored in the USB flash drive 101 connected to the printer 1 of the present embodiment and/or the data stored in the flash ROM 35.

In this connection, even if a printer does not employ a display unit or even if a printer employs an input unit and a display unit, but is inconvenient for manual operations to be performed by using the data stored in the USB flash drive 101 connected to the printer and/or the data stored in the flash ROM 35 due to design restriction of both the input unit and the display unit, the above effects can still be obtained as well as the printer 1 of the present embodiment.

Also, in the printer 1 of the present embodiment, the CPU 32 creates the coded information 203 and the text-form information 202. The coded information 203 and the text-form information 202 are corresponding to a command which the CPU 32 can execute by using the data stored in the USB flash drive 101 connected to the USB port P and/or the data stored in the flash ROM 35. The thus created coded information 203 and text-form information 202 are printed on the printing medium 201 in a layout associated with each other (refer to FIG. 4 and FIG. 5). By the printing medium 201, a user can read through manual operations which are for steps using the data stored in the USB memory 101 of USB connection and/or the data stored in the flash ROM 35 and which are for steps executed easily by reading the coded information 203 with the reader 40 (refer to FIG. 5).

In the specific example shown with FIG. 5, "1. UPDATE FIRST FIRMWARE", "2. UPDATE SECOND FIRMWARE", "3. TRANSFER TEMPLATE", "4. TRANSFER TEMPLATE FOR BACKUP" and "5. START PRINTING" printed on the printing medium 201 as text-form information 202 are the manual operations that can be performed by using the data stored in the USB memory 101 of USB connection and/or the data stored in the flash ROM 35. Any of those manual operations can be executed easily by reading the information 203 with the reader 40.

In the printer 1 of the present embodiment, when the above described second operation is performed, the data stored in the flash ROM 35 and the data stored in the USB flash drive 101 are compared. If newer firmware is stored in the USB flash drive 101 (S54: YES) or if different template data is stored in the USB flash drive 101 (S56: YES), the CPU 32 creates the coded information 203 and the text-form information 202 (S55, S57 or S58), which are correspond to a command the CPU 32 executes by using the data stored in the USB flash drive 101 connected to the USB port P of the printer 1 and/or the data stored in the flash ROM 35. The thus created coded information 203 and text-form information 202 are printed on the printing medium 201 in a layout associated with each other (S61).

That is to say, when the above described second operation is performed (refer to FIG. 9) in the printer 1 of the present embodiment, the CPU 32 refers to the data stored in the USB flash drive 101 connected to the USB port P of the printer 1 and the data stored in the flash ROM 35. The CPU 32 creates the coded information 203 and the text-form information 202 (S55, S57 or S58), which are correspond to a command the CPU 32 has determined to be effective. The thus created coded information 203 and text-form information 202 are printed on the printing medium 201 in a layout associated with each other (refer to FIG. 5 and FIG. 9). Thus, with respect to the data (firmware data and template data) stored in the USB flash drive 101 and the flash ROM 35, operation item(s) not subject to user's choice will not be printed on the printing medium 201. Therefore, a user is previously prevented from choosing a manual operation the user does not intend to do.

Specifically, when the above described second operation is performed in the printer 1 of the present embodiment, the CPU 32 refers to the data stored in the USB flash drive 101 and the data stored in the flash ROM 35. If newer firmware is not stored in the USB flash drive 101 (S54: NO) or if different template data is not stored in the USB flash drive 101 (S56: NO), the CPU 32 does not create the coded information 203 and the text-form information 202, which are corresponding to each of commands such as "1. UPDATE FIRST FIRMWARE", "2. UPDATE SECOND FIRMWARE", "3. TRANSFER TEMPLATE", and "4. TRANSFER TEMPLATE FOR BACKUP" in the examples shown in FIG. 2 and FIG. 3. Accordingly, different from the example of the printed contents on the printing medium 201 shown in FIG. 3, the CPU 32 prints out a printing medium of "OPERATION LIST OF EXTERNAL MEMORY" without indicating the coded information 203 and the text-form information 202, which are corresponding to each of commands such as "1. UPDATE FIRST FIRMWARE", "2. UPDATE SECOND FIRMWARE", "3. TRANSFER TEMPLATE", and "4. TRANSFER TEMPLATE FOR BACKUP". Thus, with respect to the data (firmware data and template data) stored in the USB flash drive 101 and the flash ROM 35, manual operations which are not subject of user's choice will not be printed on the printing medium 201. Therefore, a user is previously prevented from choosing a manual operation the user does not intend to do.

The above described configuration reduces printing amount, which leads an economical use of the printing medium.

7-1 Variant

While presently exemplary embodiments of the present disclosure have been shown and described, it is to be understood that this disclosure is for the purpose of illustration and that various changes and modifications may be made without departing from the scope of the disclosure as set forth in the appended claims.

For instance, instead of bar code, two dimensional code, RFID, etc. may be employed as specific form of the coded information 203. In case of using the above-specified substitute code information 203, the reader 40 capable of reading a two dimensional code, an RFID tag as well as a writer and a printing medium capable of implementing RFID are used.

7-2 Other Embodiment

Figure 7:
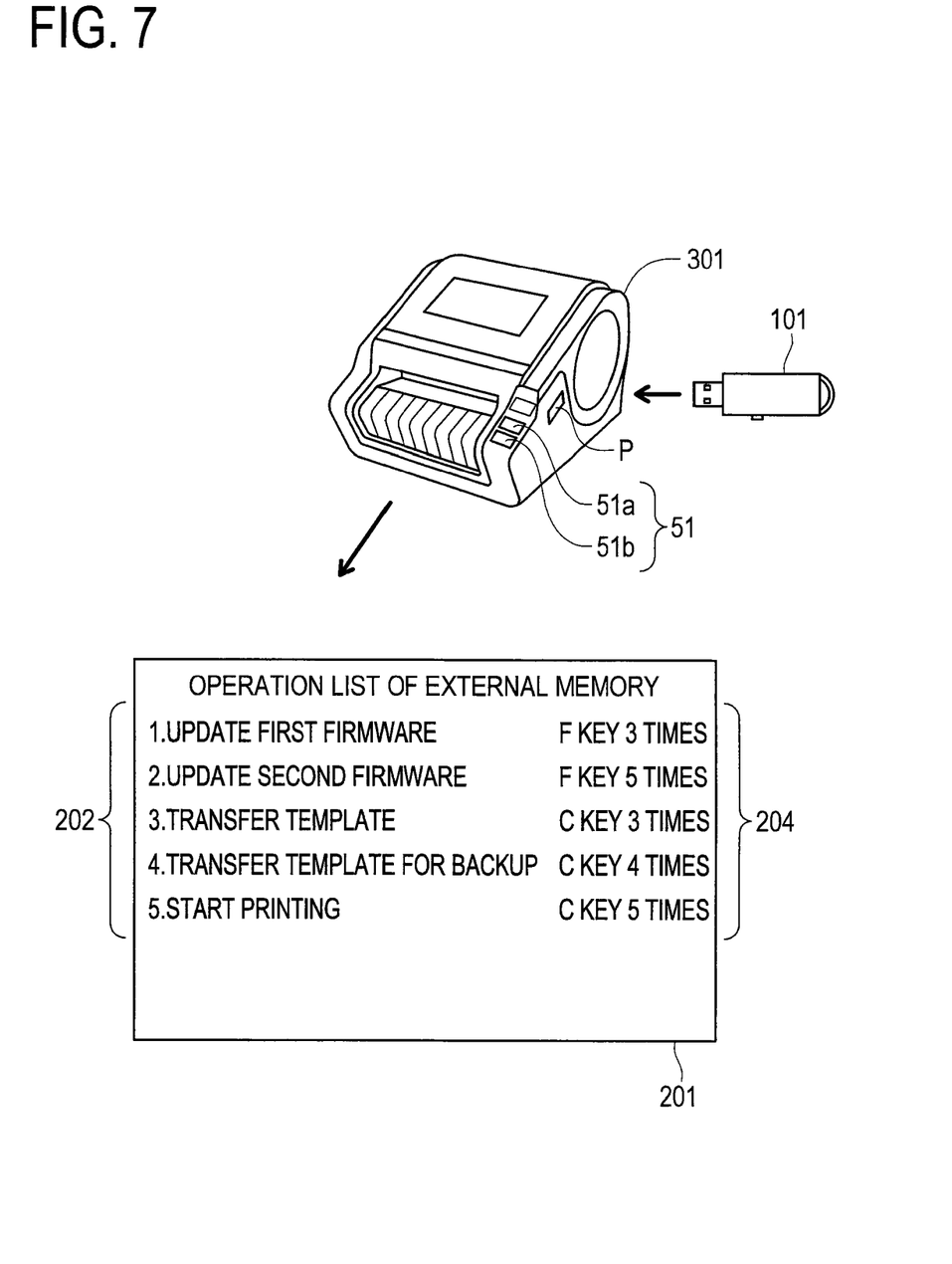
FIG. 7 is a perspective view for externally illustrating a fourth operation of other printer directed to the disclosure.
Figure 8:
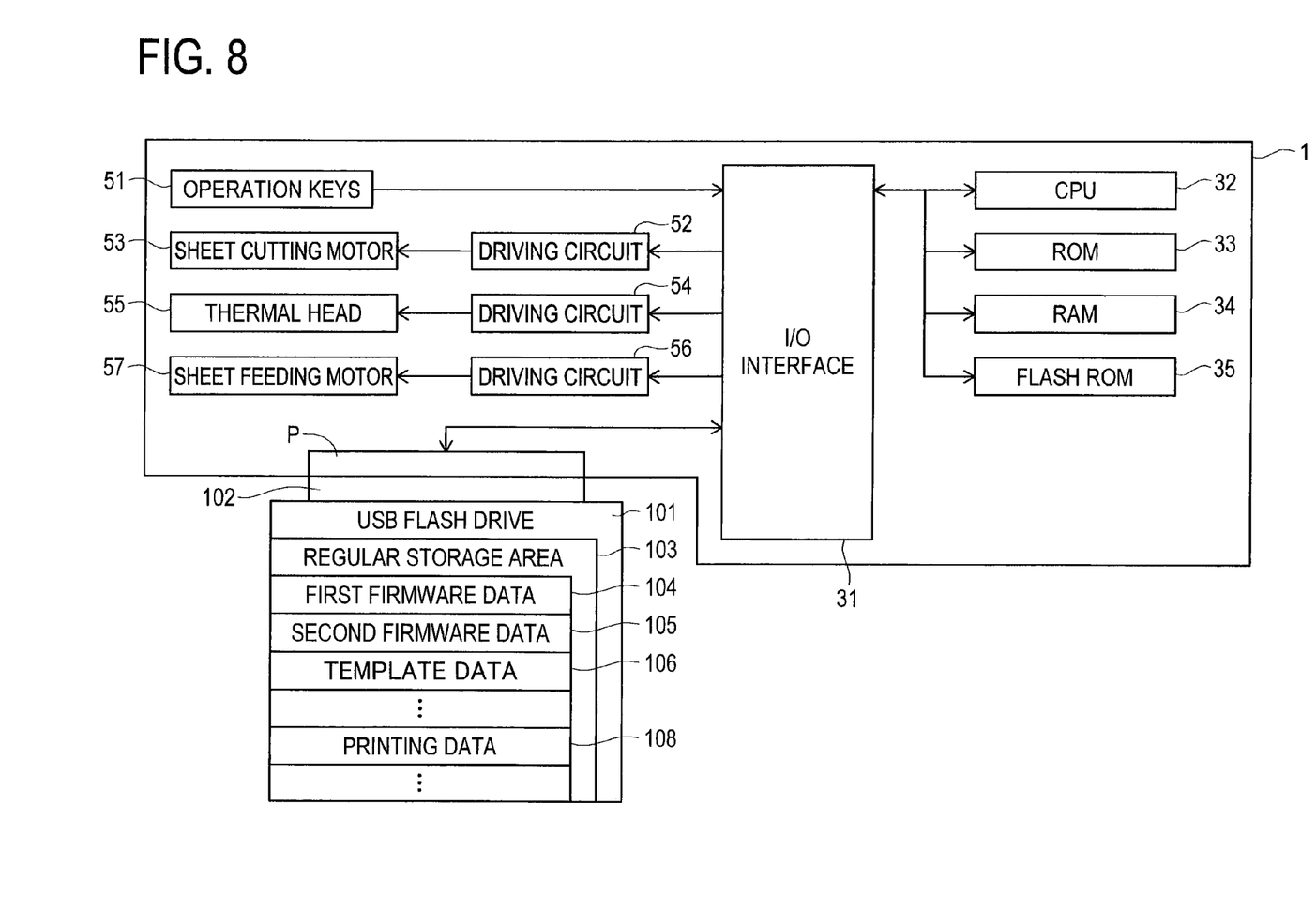
FIG. 8 is a block diagram showing an internal configuration of the printer shown in FIG. 7.

Except the absence of the reader 40 and constituent elements essential to the reader 40 (reader deriving circuit 36, port 37, connector 38, cable 39), the internal configuration of the printer 301 shown in FIG. 7 and FIG. 8 is the same as that of the printer 1 of the present embodiment. Accordingly, in FIG. 7 and FIG. 8, constituent elements identical with those in FIG. 2 and FIG. 3 are indicated with numerical references the same as those shown in FIG. 2 and FIG. 3, and descriptions of those will be omitted.

As shown in FIG. 7, in the printer 301 of the other embodiment, when the connector 102 of the USB flash drive 101 is inserted in the USB port P, when the connector 102 of the USB flash drive 101 is inserted in the USB port P, the printer 301 of the other embodiment carries out printing on a printing medium 201 by a manner that text-form information 202 and key-operation-related text-form information 204 are printed on the printing medium 201 in a layout associated with each other. Specifically, the text-form information 202 and the key-operation-related text-form information 204 are executed by using the data stored in the USB flash drive 101 and/or the data stored in the flash ROM 35. That is, when either the program shown in FIG. 4 (first operation) or the program shown in FIG. 9 (second operation) is carried out in the printer 301 of the other embodiment, the key-operation-related text-form information 204 are printed instead of the coded information 203 (refer to FIG. 3 and FIG. 5).

In the specific example of FIG. 7, the printing medium 201 is provided as "OPERATION LIST OF EXTERNAL MEMORY", wherein "F KEY 3 TIMES" of the key-operation-related text-form information 204 and the text-form information 202 of "1. UPDATE FIRST FIRMWARE" are printed in a layout associated with each other. The above layout means that a user should depress the feed key 51b three times in a row so that the CPU 32 can overwrite and save the first firmware data stored in the regular storage area 103 of the USB flash drive 101 connected to the printer 301 of the other embodiment on the firmware data stored in the flash ROM 35 of the printer 301 of the other embodiment.

Further, the printing medium 201 is provided as "OPERATION LIST OF EXTERNAL MEMORY", wherein "F KEY 5 TIMES" of the key-operation-related text-form information 204 and the text-form information 202 of "2. UPDATE SECOND FIRMWARE" are printed in a layout associated with each other. The above layout means that a user should depress the feed key 51b five times in a row so that the CPU 32 can overwrite and save the second firmware data stored in the regular storage area 103 of the USB flash drive 101 connected to the printer 301 of the other embodiment on the firmware data stored in the flash ROM 35 of the printer 301 of the other embodiment.

Further, the printing medium 201 is provided as "OPERATION LIST OF EXTERNAL MEMORY", wherein "C KEY 3 TIMES" of the key-operation-related text-form information 204 and the text-form information 202 of "3. TRANSFER TEMPLATE" are printed in a layout associated with each other. The above layout means that a user should depress the cut key 51a three times in a row so that the CPU 32 can transfer and add the template data stored in the regular storage area 103 of the USB flash drive 101 connected to the printer 301 of the other embodiment to the flash ROM 35 of the printer 301 of the other embodiment.

Further, the printing medium 201 is provided as "OPERATION LIST OF EXTERNAL MEMORY", wherein "C KEY 4 TIMES" of the key-operation-related text-form information 204 and the text-form information 202 of "4. TRANSFER TEMPLATE FOR BACKUP" are printed in a layout associated with each other. The above layout means that a user should depress the cut key 51a four times in a row so that the CPU 32 can transfer and add appropriate template data stored in the flash ROM 35 of the printer 301 of the other embodiment to the regular storage area 103 of the USB flash drive 101 connected to the printer 301 of the other embodiment for the purpose of backup.

Further, the printing medium 201 is provided as "OPERATION LIST OF EXTERNAL MEMORY", wherein "C KEY 5 TIMES" of the key-operation-related text-form information 204 and the text-form information 202 of "5. START PRINTING" are printed in a layout associated with each other. The above layout means that a user should depress the cut key 51a five times in a row so that the CPU 32 can get developing the printing data stored in the regular storage area 103 of the USB flash drive 101 connected to the printer 301 of the other embodiment at the RAM 34 of the printer 301 of the other embodiment and subsequently print the thus developed printing data on a printing medium.

As described, the printer 301 of the other embodiment employs the operation keys 51 consisting of the cut key 51a and the feed key 51b as an input unit, but not a display unit. Therefore, the printer 301 is not conveniently designed due to restriction of the operation keys 51 for manual operations of steps using the data stored in the USB flash drive 101 of USB connection and/or the data stored in the flash ROM 35. However, with respect to the manual operation of steps using the data stored in the USB flash drive 101 connected to the USB port P and/or the data stored in the flash ROM 35, the CPU 32 creates the key-operation-related text-form information 204 shown by a simple operation procedure of the operation keys 51 (continuous depression of the cut key 51a or the feed key 51b), and prints the thus created key-operation-related text-form information 204 on the printing medium (refer to FIG. 4, FIG. 7 and FIG. 9). By the printing medium 201, a user can read through manual operations which are for steps using the data stored in the USB memory 101 of USB connection and/or the data stored in the flash ROM 35 and which are for steps executed easily by operation of the operation keys 51 (the cut key 51a and the feed key 51b), (refer to FIG. 7).

In this connection, even if a printer employs a display unit, but is inconvenient for manual operations to be performed by using the data stored in the USB flash drive 101 connected to the printer and/or the data stored in the flash ROM 35 due to design restriction of the display unit, the above effects can still be obtained as well as the printer 301 of the other embodiment.

Further, when the above described second operation is performed (refer to FIG. 9) in the printer 301 of the other embodiment, the CPU 32 refers to the data stored in the USB flash drive 101 connected to the USB port P of the printer 1 and the data stored in the flash ROM 35. The CPU 32 creates the key-operation-related text-form information 204 and the text-form information 202, which are correspond to a command the CPU 32 has determined to be effective. The thus created key-operation-related text-form information 204 and text-form information 202 are printed on the printing medium 201 in a layout associated with each other (refer to FIG. 7 and FIG. 9). Thus, with respect to the data (firmware data and template data) stored in the USB flash drive 101 and the flash ROM 35, manual operations which are not subject of user's choice will not be printed on the printing medium 201. Therefore, a user is previously prevented from choosing a manual operation the user does not intend to do. Further, the above described configuration reduces printing amount, which leads an economical use of the printing medium.

7-3. Variant

In the above described embodiments, the USB flash drive 101 is used. However, the disclosure can be realized by using various memory cards other than the USB flash drive 101.

7-4. Variant

In the above described embodiments, "6. TRANSFER HISTORY INFORMATION FOR BACKUP" may be carried out as example of backup process. In that case, when the connector 102 of the USB flash drive 101 is inserted in the USB port P of the printer 1 or 301, the coded information 203 (refer to FIG. 3 and FIG. 5) and "6. TRANSFER HISTORY INFORMATION FOR BACKUP" of the text-form information 202 are printed on the printing medium 201 in a layout associated with each other. Alternatively, the key-operation-related text-form information 204 (refer to FIG. 7) and "6. TRANSFER HISTORY INFORMATION FOR BACKUP" of the text-form information 202 are printed on the printing medium 201 in a layout associated with each other. After that, if the coded information 203 (refer to FIG. 3 and FIG. 5) corresponding to the text-form information 202 of "6. TRANSFER HISTORY INFORMATION FOR BACKUP" is read by the reader 40, or if a manual operation that follows the key-operation-related text-form information 204 (refer to FIG. 7) corresponding to the text-form information 202 of "6. TRANSFER HISTORY INFORMATION FOR BACKUP" is performed by a user, the CPU 32 transfers and adds appropriate history information data (number of printings, printing length, and times to cut off printing medium, etc.) stored in the flash ROM 35 of the printer 1 or 301 to the regular storage area 103 of the USB flash drive 101 for backup.

What is claimed is:
1. A printer comprising:
a connection port that connects an external storage device to the printer;
a command input unit that inputs coded information or text-form information;

a processor that executes a command corresponding to coded information or text-form information inputted in the command input unit by using data stored in the external storage device connected to the connection port;

a printing unit that prints coded information on a printing medium under control of the processor; and an internal storage device;

wherein the command input unit includes a reader that reads coded information, wherein the processor executes, by using data stored in the external storage device connected to the connection port and/or data stored in the internal storage device, a command corresponding to coded information read by the reader, wherein, when the external storage device is connected to the connection port, the processor executes steps of:

[1] analyzing data stored in the external storage device connected to the connection port and/or data stored in the internal storage device;

[2] creating coded information and text-form information that are corresponding to a command based on the analyzing result; and

[3] printing in an associated manner both the coded information and the text-form information on a printing medium by the printing unit; and wherein the processor determines an effective command by comparing both data stored in the external storage device connected to the connection port and data stored in the internal storage device and deals with the effective command as a command based on the analyzing result.

2. A printer comprising:

a connection port that connects an external storage device to the printer;

a command input unit that inputs coded information or text-form information;

a processor that executes a command corresponding to coded information or text-form information inputted in the command input unit by using data stored in the external storage device connected to the connection port, a printing unit; and an input key that relates to an operation of the printing unit and is included in the command input unit, wherein, when the external storage device is connected to the connection port, the processor executes steps of:

[1] analyzing data stored in the external storage device connected to the connection port and/or data stored in the internal storage device;

[2] creating text-form information which indicated an operation procedure of the input key as a manual operation for executing a command based on the analyzing result; and

[3] printing the text-form information on the printing medium by the printing unit;

wherein the processor determines an effective command by comparing both data stored in the external storage device connected to the connection port and data stored in the internal storage device and deals with the effective command as a command based on the analyzing result.

* * * * *